United States Patent Office 3,499,817
Patented Mar. 10, 1970

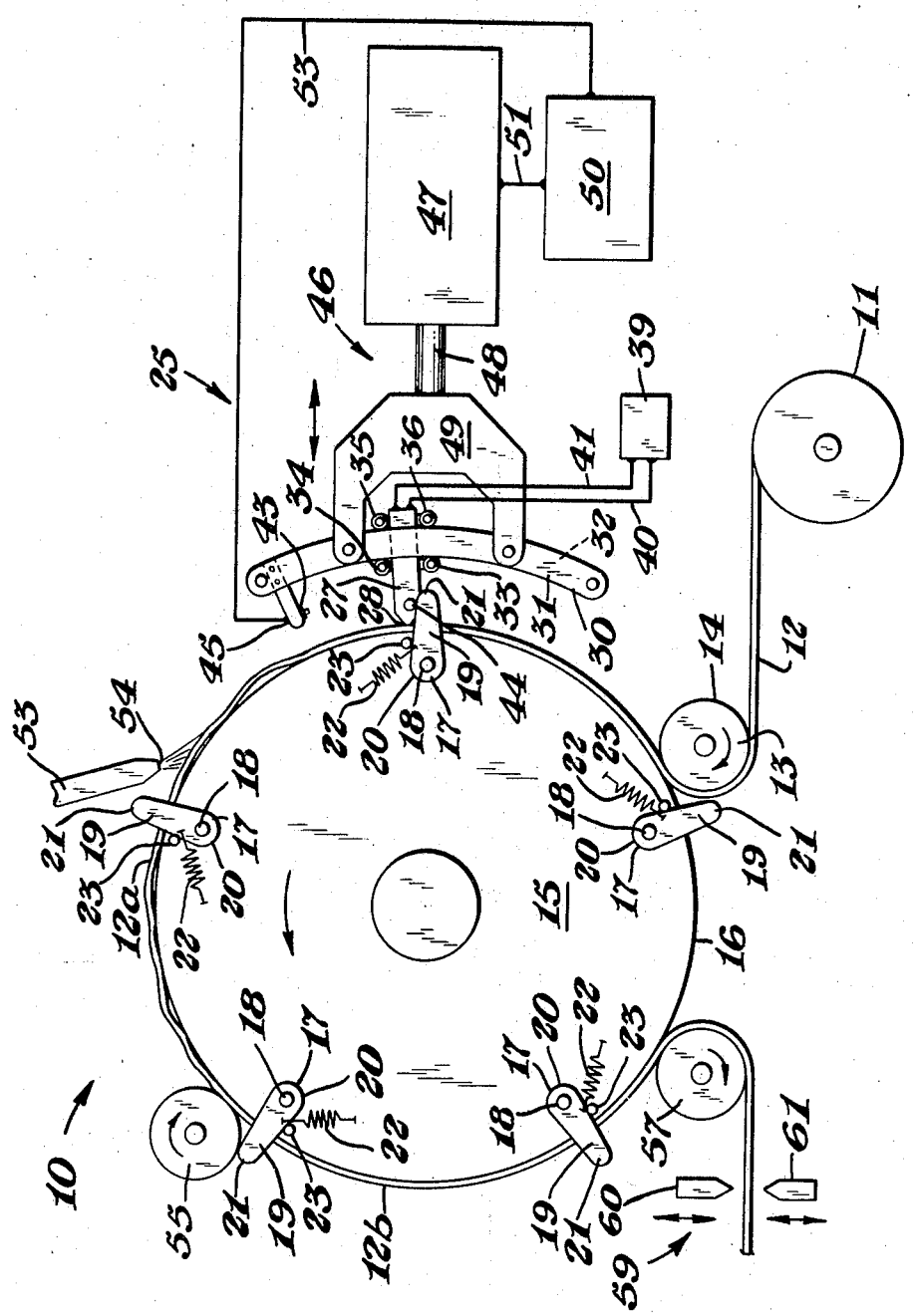

3,499,817
APPARATUS FOR THE FORMATION OF SEALS IN THERMOPLASTIC FILM
Carl B. Havens, Findlay, and Heinz U. Marx, Parma, Ohio, assignors to The Dow Chemical Company, Midland, Mich., a corporation of Delaware
Filed Sept. 6, 1966, Ser. No. 577,221
Int. Cl. B32b 31/20
U.S. Cl. 156—498                    9 Claims

ABSTRACT OF THE DISCLOSURE

An apparatus to form a plurality of longitudinally spaced transverse seals in a themoplastic tube. The apparatus has a rotating cylindrical drum which feeds the thermoplastic tube past a transverse heated sealing head. The heated sealing head is provided with structure which moves the head radially in contact with the thermoplastic tube and which also moves circumferentially with the movement of the tube. A cooling fluid is directed against the tube after the heat seal has been made by the heat seal head. The circumferential movement of the tube is less than that of the cylindrical drum so that the tube is tension-free at the heat sealed portion of the tube.

---

This invention relates to an improved apparatus for sealing thermoplastic film, and more particularly relates to an improved apparatus for continuously forming improved seals in oriented thermoplastic resinous film.

Frequently in the manufacture of articles from synthetic resinous film, it is desired to form a plurality of transverse seals in a flattened tube and subsequently portions of the tube are severed to form a plurality of bags. It is highly desirable in the formation of bags or like containers from flattened synthetic resinous tubes that seals of maximum strength are obtained. Generally, the strength of the seal should be close to the strength of the film itself in order to provide maximum utility. Oftentimes in the formation of such transverse seals, sealing is accomplished in such a manner that the sealed portion is thinner than the combined thickness of the two layers being joined. This is particularly disadvantageous in the case of oriented film as the strength of the seal is oftentimes well below the strength of the film requiring a thicker film for a given application.

It would be beneficial if there were available an apparatus that would form improved seals in synthetic resinous thermoplastic materials.

It would also be advantageous if there were available an apparatus which would provide improved transverse seals in flattened thermoplastic resinous tubing.

It would be further advantageous if there were available an apparatus which would form improved transverse seals in synthetic resinous material in a continuously moving web.

These benefiits and other advantages in accordance with the apparatus of the present invention are achieved in an apparatus for sealing synthetic resinous thermoplastic film which comprises in cooperative combination a film support means, a film feed means and a film take away means, the film feed means adapted to deliver at least two layers of synthetic thermoplastic resinous film onto a surface of the support means, the film take away means adapted to remove film from the support surface, means to retard the passage of film from the supply means to the take away means and maintain the film in a longitudinally untensioned manner on the surface of the support means, means to heat the thermoplastic resinous film to a sealing temperature in a selected location in the form of a transverse strip extending across the width of the film and means to cool the film below its thermoplastic temperature disposed immediately adjacent the means to heat the film.

Further features and advantages of the present invention will become more apparent from the following specification when taken in connection with the drawing wherein:

In the figure there is illustrated a schematic representation of one embodiment of the sealing apparatus in accordance with the present invention generally designated by the reference numeral 10. The apparatus 10 comprises in cooperative combination a film supply means 11 adapted to provide a web 12. The web 12 beneficially comprises thermoplastic resinous film which is to be sealed together in selective locations. The web 12 may comprise a tube or two or more layers of heat sealable synthetic resinous film. The web 12 passes about a drive roll 13 having an external cylindrical surface 14. A film support means or support drum 15 is disposed adjacent the roll 13. The drum 15 has an external cylindrical film support surface 16. The web 12 is deposited on the surface 16 by the roll 13. The drum 15 carries a plurality of spaced apart resiliently tensioned sealing member engaging means 17. Each of the means 17 comprises a pivot 18, an arm 19 having a first end 20 pivotally affixed to the pivot 18. A second end 21 of the arm 19 extends beyond the surface of the drum. A tensioning member 22 is in operative engagement with the arm 19. A stop means 23 is affixed to the drum 15 and disposed adjacent the arm 19 to limit the travel of the arm in the direction of tensioning and maintain the first end 21 at a location generally remote from the center of the drum 14. A sealing mechanism generally designated by the reference numeral 25 is disposed adjacent the surface 16 of the drum 15 and generally adjacent the roll 13. The sealing apparatus comprises in cooperative combination a heat sealing head 27 having a lineal heating element 28 extending across the surface 16 of the drum 15. The sealing head 27 is slidably supported on a means or arcuate frame 30 which effectively permits partial rotation of the sealing head about the center of the drum 15. Beneficially, the means 30 comprises a first frame member 31 and a second frame member 32 adapted to slidably receive the head 27 which is supported thereon by means of rollers 33, 34, 35 and 36. The sealing head 27 is in operative communication with an electrical power supply 39 by means of conductors 40 and 41. The head 27 is mounted so as to travel in an arcuate path defined by the frame 30 having its center at the center of the drum 15. The sealing head 27 has an arm engaging means 44 adapted to engage the second end 21 of the arm 19. A stop means 43 is supported by the frame 30 at a location remote from the portion of the frame 30 adjacent the roll 13. The stop means 43 supports a control means 45 which is activated by engagement with the sealing head 27 or beneficially with the arm 19. A sealer positioning means 46 is in operative communication with the frame 30. The sealer positioning means 46 comprises a linear actuator 47 having a moveable member 48. The member 48 supports a yoke 49 which is affixed to the frame 30. The actuating means 47 is adapted to move the yoke 49 along a projected radius of the drum 15. A power source and control means 50 is in operative communication with the linear actuator by means of the line 51. The control means 45 is in operative communication with the power source and control means 50. Generally adjacent the stop 43 of the frame 30 is disposed a cooling fluid source 53. The cooling fluid source 54 beneficially defines an exit opening 54 adapted to provide cooling fluid such as a stream of air onto the surface of the film remote from the surface 16 and adjacent the stop means 43. An underdrive roll 55 is positioned generally adjacent the drum 14 and remotely disposed from the roll 13. The underdrive roll 55, the roll 13 and the drum 15 have axes of rotation which are parallel. A take away roll 57 is disposed between the roll 13 and the roll 55 and remote from the sealing assembly 25 and is adapted to remove the web from the drum. Generally adjacent the roll 57 is a web severing means 59. The web severing means 59 comprises a knife 60 and an anvil 61 adapted to sever a web at predetermined intervals. The web 13 disposed on the surface 16 of the drum 15 forms a periodically, transversely sealed web 12a relatively free of longitudinal tension in the region on the surface 16 of the drum 15 lying between the rolls 55 and 57. The transversely sealed web is flattened and under tension and is designated by the reference character 12b. For the sake of clarity, drive mechanisms for the drum 15 and the rolls 13, 55, 57 and the severing means 59 have been omitted from the drawing.

In operation of the apparatus in accordance with the present invention, a web 12 such as a flattened synthetic thermoplastic tube or two or more flat synthetic thermoplastic webs is fed to the roll 13 where it is supported on the surface 14 of the roll 13 at a rate of travel slightly greater than the surface speed of the surface 16 of the drum 15. When the sealing head 27 is not in engagement with an arm 19, gravity causes the head to slide along the frame 30 to a position along the roll 13. The arms 19 are positioned about the periphery of the drum 15 in such a manner that when the positioning means 46 moves the sealing head toward the film, the arm 19 forces the sealing head along the frame 30 toward the stop means 43. The power source 39 is providing electrical power to the elongate transverse heating element 28 thereby raising the synthetic resinous film to a temperature sufficiently high to permit heat sealing as the portion of the web adjacent the sealing head 25 reaches a location on the periphery of the drum 14 adjacent the stop 23. The stop 43 and the control means 45 are in engagement optionally by the sealing head or the arm 19 whereupon the power source and control means 50 withdraws the frame 30 a short distance from the surface 16 of the drum 15. The sealing head by gravity or other suitable means is returned to a position upon the frame 30 generally adjacent the roll 13. By means of a timing mechanism within the power source and control means 50 the linear actuator 47 forces the frame 30 closer to the surface 16 of the drum 15 at an appropriate time for an arm 19 to engage the sealing head 27 and form a second transverse seal within the film. A stream of air or other cooling fluid contacts the surface of the film remote from the drum as the positioning means 46 moves the sealing head 27 away from the surface 16 of the drum 15. The roll 55 is operated at a speed slightly less than the lineal speed of the surface 16 of the drum 15 and from a substantially stress-free or relaxed portion 12a of the freshly sealed web. The film 12a passes between the drum 55 and the surface 16 of the drum 15 along the surface 16 to the takeoff roll 57 which is operating at a lineal speed of the surface 16 of the drum 15. Beneficially, the web 12b having a plurality of seals extending transversely across is placed into the severing device 59 which severs the film in a direction generally parallel to the spaced seals to form a plurality of bags. In operation of the apparatus in accordance with the present invention, the roll 13 is driven at a speed slightly faster than the surface speed of the drum 14 and the roll 55 at a speed slightly less than the surface speed of the drum 14. Thus, slippage is permitted to occur on both of these rolls and the relaxed or tension-free region of the web 12a is formed.

As is apparent to those skilled in the art, obvious mechanical modifications may be made to the apparatus and still fall within the scope and purposes of the present invention.

By way of further illustration, employing an apparatus generally in accordance with that of the figure, a tube of a low density branched polyethylene film having a wall thickness of 2.5 mils was sealed employing the apparatus of the present invention and the resultant seal evaluated in terms of seal strength and expressed as a percentage of the strength of the film. The average of five samples indicated the seal strength was 83 percent of strength of the film and the seals ranged from 73 to 100 percent of the strength of the film. Other portions of the sealed film were aged for 48 hours at 180° F. in contact with butter. When the seals were evaluated for strength, like results were obtained.

By way of contrast, a portion of the web was sealed using the same sealing mechanism but in an intermittent manner wherein the seal was cooled under pressure. Five seals averaged 58 percent of the strength of the original film and ranged from 52 to 69 percent. Evaluation of five seals aged in the presence of butter for 48 hours at 180° F. showed 54 percent of the original film strength and ranged from 50 to 58 percent.

The apparatus of the present invention is also applied with great benefit to other synthetic resinous materials including biaxially oriented polypropylene, copolymers of 10 percent vinyl acetate and 90 percent ethylene, polyvinyl chloride, nylon, rubber hydrochloride, biaxially oriented polystyrene and the like.

What is claimed is:

1. An apparatus for sealing synthetic resinous thermoplastic film which comprises in cooperative combination
   a film support means having the form of a cylindrical drum,
   a film feed means, and
   a film take away means,
   the film feed means adapted to deliver at least two layers of synthetic thermoplastic resinous film onto a surface of the support means,
   the film take away means adapted to remove film from the support surface,
   means to retard the passage of film from the supply means to the take away means and maintain the film in a longitudinally untensioned manner on the surface of the support means,
   means to heat the thermoplastic resinous film to a sealing temperature in a selected location in the form of a transverse strip extending across the width of the film, and
   means to cool the film below its thermoplastic temperature disposed immediately adjacent the means to heat the film.

2. The apparatus of claim 1 wherein the means to heat the thermoplastic resinous film is an electrically powered generally linear heating element.

3. The apparatus of claim 1 wherein the means to retard the passage of film is a roll.

4. The apparatus of claim 1 wherein the film support means is a drum having an external cylindrical surface, the film feed means is a film feed drum disposed adjacent the outer cylindrical surface of the support means, the means to heat the thermoplastic resinous film comprises an elongate heating element disposed generally parallel to the axis of rotation of the film support means.

5. The apparatus of claim 4 wherein the means to retard the passage of film comprises a roll disposed adjacent the cylindrical surface of the film support means and adapted to rotate at a surface speed less than the speed of rotation of the film support means.

6. The apparatus of claim 5 including means to reciprocally position the sealing means in a generally radial manner with respect to the film support means.

7. The apparatus of claim 6 wherein the means to heat the thermoplastic resinous film is reciprocally moved about an arc having a radius and center generally corresponding to the center of the film support means.

8. The apparatus of claim 7 including a stop means adapted to engage means to heat the thermoplastic resinous film and withdraw the means to heat the thermoplastic resinous film from a work piece on the surface of the support means.

9. An apparatus for sealing synthetic resinous thermoplastic film which comprises in cooperative combination
a film support means,
a film feed means, an
a film take away means,
the film feed means adapted to deliver at least two layers of synthetic thermoplastic resinous film onto a surface of the support means at a speed slightly faster than the surface speed of the support means,
the film take away means adapted to remove film from the support surface,
means to retard the passage of film from the supply means to the take away means and maintain the film in a longitudinally untensioned manned on the surface of the support means,
means to heat the thermoplastic resinous film to a sealing temperature in a selected location in the form of a transverse strip extending across the width of the film, and
means to cool the film below its thermoplastic temperature disposed immediately adjacent the means to heat the film.

References Cited

UNITED STATES PATENTS

| | | | |
|---|---|---|---|
| 2,720,246 | 10/1955 | Piazze | 156—498 |
| 2,737,859 | 3/1956 | Allison et al. | 93—8 |
| 2,855,831 | 10/1958 | Di Nunzio et al. | 93—8 |
| 2,944,586 | 7/1960 | Yanulis | 156—498 |
| 2,999,533 | 9/1961 | Slagel et al. | |
| 3,208,898 | 9/1965 | Chavannes et al. | 156—498 |

ROBERT F. STAHL, Primary Examiner

U.S. Cl. X.R.

156—86, 183, 306, 311